US007463395B2

(12) United States Patent
Utagawa et al.

(10) Patent No.: US 7,463,395 B2
(45) Date of Patent: Dec. 9, 2008

(54) METHOD FOR RECORDING INFORMATION INTO REWRITABLE THERMAL LABEL OF THE NON-CONTACT TYPE

(75) Inventors: Tetsuyuki Utagawa, Kawaguchi (JP); Hiroaki Iwabuchi, Saitama (JP); Takehiko Nishikawa, Saitama (JP); Chisato Iino, Koshigaya (JP); Naoji Noda, Kakamigahara (JP); Kaoru Mizutani, Kani (JP)

(73) Assignee: Lintec Corporation, Tokyo (JP)

( * ) Notice: Subject to any disclaimer, the term of this patent is extended or adjusted under 35 U.S.C. 154(b) by 163 days.

(21) Appl. No.: 11/388,162

(22) Filed: Mar. 23, 2006

(65) Prior Publication Data

US 2006/0221424 A1 Oct. 5, 2006

(30) Foreign Application Priority Data

Mar. 31, 2005 (JP) ............................ 2005-102070

(51) Int. Cl.
*G02B 26/08* (2006.01)

(52) U.S. Cl. ...................................................... 359/212

(58) Field of Classification Search ................. 359/205, 359/212

See application file for complete search history.

(56) References Cited

U.S. PATENT DOCUMENTS 4,873,413 A * 10/1989 Uesugi et al. ............... 347/247
6,956,010 B2 10/2005 Tsukida et al.
2005/0170960 A1 8/2005 Tsukida et al.

FOREIGN PATENT DOCUMENTS

JP 2002-215038 A 7/2002
JP 2003-118238 A 4/2003
JP 2003-320694 A 11/2003
JP 2003-320695 A 11/2003
JP 2004-90026 A 3/2004
JP 2004-94510 A 3/2004

OTHER PUBLICATIONS

U.S. Appl. No. 11/895,944, filed Aug. 28, 2007, Confirmation No. 3522.

* cited by examiner

*Primary Examiner*—Euncha P Cherry
(74) *Attorney, Agent, or Firm*—Frishauf, Holtz, Goodman & Chick

(57) ABSTRACT

A method for recording information into a rewritable thermal label of a non-contact type by irradiation with a laser beam is provided. When a prescribed drawing is conducted by irradiation with a laser beam focused on the rewritable thermal label of a non-contact type using an optical scanning apparatus, the optical scanning apparatus is driven continuously without activating oscillation for the laser beam, and the drawing is conducted by activating the oscillation for the laser beam and scanning with the laser beam only when a locus of a laser beam which would be emitted if the oscillation for the laser beam would be active (a virtual laser beam) moves at a substantially uniform speed. Damages to the recording face of a recording medium after repeated recording and erasure of information by a non-contact method are decreased, and the recording medium can be used repeatedly 1,000 times or more.

12 Claims, 6 Drawing Sheets

METHOD FOR RECORDING INFORMATION INTO REWRITABLE THERMAL LABEL OF THE NON-CONTACT TYPE

BACKGROUND OF THE INVENTION

1. Field of the Invention

The present invention relates to a method for recording information into a rewritable thermal label of the non-contact type. More particularly, the present invention relates to a method for recording information into a rewritable thermal label of the non-contact type which decreases damages to the recording face of a recording medium after repeated recording and erasure of information in accordance with the non-contact method and enables the recording medium to be used repeatedly 1,000 times or more.

2. Description of Related Art

As the label for control of articles such as labels attached to plastic containers used for transporting foods, labels used for control of electronic parts and labels attached to cardboard boxes for physical distribution management, currently, labels having a heat-sensitive recording material are mainly used. In the heat-sensitive recording material, a heat-sensitive recording layer containing an electron-donating dye precursor which is, in general, colorless or colored slightly and an electron-accepting color developing agent as the main components is formed on a support. When the heat-sensitive recording material is heated by a heated head or a heated pen, the dye precursor and the color developing agent react instantaneously with each other, and a recorded image is obtained. As the heat sensitive recording material, rewritable labels which allows formation of an image, erasure of the formed image and rewriting of another image are increasingly used recently. When the label attached to an adherend is treated for rewriting without detaching the label from the adherend, it is necessary that the recorded images be erased while the label remains attached to the adherend and, thereafter, the label attached to the adherend be passed through an ordinary printer for rewriting of other images. For this purpose, it is necessary that the erasure and the writing be performed in accordance with a method performed without contacting the label.

For the repeated use of a label, in recent years, reversible heat sensitive recording materials which allow recording and erasure of images have been developed. Examples of such materials include (1) a reversible heat-sensitive recording material having a heat-sensitive layer which is formed on a substrate and contains a resin and an organic low molecular weight substance showing reversible changes in transparency depending on the temperature and (2) a reversible heat-sensitive recording material having a heat-sensitive color development layer which is formed on a substrate and contains a dye precursor and a reversible color developing agent.

However, damages are accumulated on the recording face of the recording medium after the repeated use in the case of the conventional rewritable thermal labels of the non-contact type. This causes a drawback in that the number of repeating in the use decreases due to the damages on the recording face. A further drawback arises for recording an image formed by a cluster of lines such as a solid image in that, when lines close to each other are recorded by the continuous scanning with a laser light, portions of the image recorded before are erased and a clear image is not obtained.

Specifically, in the conventional method of scanning with the laser light, a scanner along the X-axis and a scanner along the Y-axis are driven for each of many lines constituting a character or a figure based on the data of the coordinates of the locus, and this causes the following problems. Since the scanner along the X-axis and the scanner along the Y-axis are stopped at the beginning of the drawing (the starting point) and at the end of the drawing (the end point) of a line, the scanning mirrors along each of the axes are accelerated or decelerated at portions in the vicinity of the starting point and the end point. Since the laser beam is applied at the constant output during the period of the acceleration and the deceleration, the laser energy is applied in a greater amount at portions in the vicinity of the starting point and the end point than the amount at other portions, and degradation of the substrate takes place more markedly in the excessively irradiated portions. As another problem, when a character is drawn by connecting lines, degradation of the substrate takes place in the overlapped portion due to the repeated irradiation with the laser beam since a line drawn before is irradiated again with the laser beam. As still another problem, when an cluster of lines such as a bar code is drawn, the line of the bar code drawn before is erased or has a decreased concentration due to the drawing of the adjacent subsequent line depending on the relation between the time interval between the drawings of the adjacent lines and the temperature of the substrate caused by the irradiation with the laser beam. The scanner in the above descriptions means scanning mirrors.

References related to the above descriptions are as follows:

[Patent Reference 1] Japanese Patent Application Laid-Open No. 2003-118238.

[Patent Reference 2] Japanese Patent Application Laid-Open No. 2002-215038.

[Patent Reference 3] Japanese Patent Application Laid-Open No. 2003-320694.

[Patent Reference 4] Japanese Patent Application Laid-Open No. 2003-320695.

[Patent Reference 5] Japanese Patent Application Laid-Open No. 2004-90026.

[Patent Reference 6] Japanese Patent Application Laid-Open No. 2004-94510.

BRIEF SUMMARY OF THE INVENTION

The present invention has an object of overcoming the above problems and providing a method for recording information into a rewritable thermal label of the non-contact type which decreases damages to the recording face of a recording medium after repeated recording and erasure of information in accordance with the non-contact method and enables the recording medium to be used repeatedly 1,000 times or more.

As the result of intensive studies by the present inventors to achieve the above object, it was found that the damages on the recording face of a recording medium could be decreased when, in a prescribed drawing by irradiation with a laser beam focused on the rewritable thermal label of a non-contact type using an optical scanning apparatus, the optical scanning apparatus was driven continuously without activating oscillation for the laser light and the drawing was conducted by activating the oscillation for the laser light and scanning with the laser light only when a locus of a virtual laser beam moved at a substantially uniform speed. The present invention has been completed based on this knowledge.

The present invention provides:

(1) A method for recording information into a rewritable thermal label of a non-contact type by irradiation with a laser beam, the method comprising, when a prescribed drawing is conducted by irradiation with a laser beam focused on the rewritable thermal label of a non-contact type using an optical scanning apparatus, driving the optical scanning apparatus continuously without activating oscillation for the laser light and conducting the drawing by activating the oscillation for the laser light and scanning with the laser light only when a virtual laser beam which is defined as a locus of a laser beam which would be emitted if the oscillation for the laser light would be active moves at a substantially uniform speed;

(2) The method for recording information into a rewritable thermal label of a non-contact type described in (1), wherein, when a line to be drawn overlaps with a line drawn before, the scanning with the laser light is conducted in a manner such that suspending drawing just before overlapping the line drawn before and resuming drawing after the virtual laser beam passes said line drawn before;

(3) The method for recording information into a rewritable thermal label of a non-contact type described in (1), wherein, when a line comprising a folded point is drawn, drawing a prescribed portion of the folded line by scanning with the laser light, suspending the scanning with the laser light when the laser beam reaches said folded point, driving of the optical scanning apparatus being kept continuously in a manner such that the virtual laser beam makes a loop starting from said folded point, and when the virtual laser beam returns to said folded point and passes said folded point, resuming the scanning with the laser light for drawing the next portion of the folded line;

(4) The method for recording information into a rewritable thermal label of a non-contact type described in any one of (1) to (3), wherein the optical scanning apparatus comprises a source of the laser light, scanning mirrors which can be driven for rotation and are used for scanning with the laser light emitted from the source and an optical system for correction of a focal distance to focus the laser light scanned by the scanning mirrors, and, when a prescribed drawing is conducted by irradiation with the laser beam focused on the rewritable thermal label of a non-contact type, the scanning mirrors are driven continuously and the drawing is conducted by activating the oscillation for the laser light and scanning with the laser light only when the scanning mirrors move at a substantially uniform speed;

(5) The method for recording information into a rewritable thermal label of a non-contact type described in (4), wherein the scanning mirror which can be driven for rotation in the optical scanning apparatus is a galvanomirror, a polygon mirror or a resonant mirror; and (6) The method for recording information into a rewritable thermal label of a non-contact type described in any one of (4) and (5), wherein the optical system for correction of a focal distance in the optical scanning apparatus is a f-θ lens.

Figure 1:
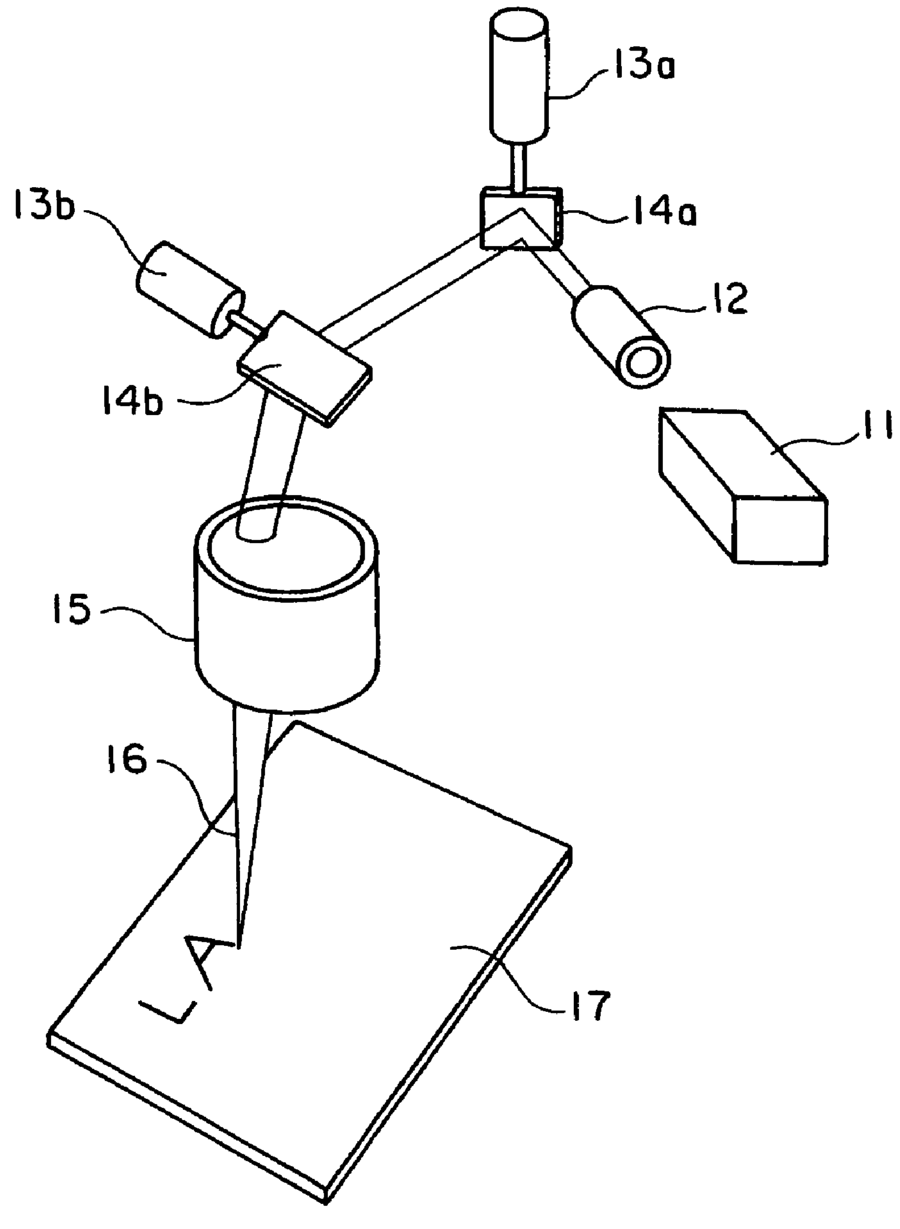
FIG. 1 shows a schematic diagram exhibiting an example of the optical scanning apparatus used in the method for recording information into a rewritable thermal label of the non-contact type of the present invention.

In the Figures, the numbers have the following meanings:

11: An laser oscillator

12: A lens for increasing the diameter of the spot of a laser light

13*a*, 13*b*: Motors

14*a*: A galvanomirror for scanning along the Y-axis

14*b*: A galvanomirror for scanning along the X-axis

15: An optical system for correction of the focal distance

16: A laser beam

17: A rewritable thermal label of the non-contact type

DETAILED DESCRIPTION OF THE INVENTION

The method for recording information into a rewritable thermal label of a non-contact type of the present invention is a method for recording information into a rewritable thermal label of a non-contact type by irradiation with a laser beam which comprises, when a prescribed drawing is conducted by irradiation with a laser beam focused on the rewritable thermal label of a non-contact type using an optical scanning apparatus, driving the optical scanning apparatus continuously without activating oscillation for the laser light and conducting the drawing by activating the oscillation for the laser light and scanning with the laser light only when a virtual laser beam which is defined as the locus of a laser beam which would be emitted if the oscillation for the laser light would be active moves at a substantially uniform speed.

It is preferable that when a line to be drawn overlaps with a line drawn before, the scanning with the laser light is conducted in a manner such that suspending drawing just before overlapping the line drawn before and resuming drawing after the virtual laser beam passes said line drawn before. It is also preferable that, when a line comprising a folded point is drawn, drawing a prescribed portion of the folded line by scanning with the laser light, suspending the scanning with the laser light when the laser beam reaches said folded point, driving of the optical scanning apparatus being kept continuously in a manner such that the virtual laser beam makes a loop starting from said folded point, and when the virtual laser beam returns to said folded point and passes said folded point, resuming the scanning with the laser light for drawing the next portion of the folded line.

In the present invention, “activating oscillation for a laser light” means an operation of emitting a laser light by switching on the oscillator of a laser which is an apparatus for emitting the laser light; “scanning with a laser light” means scanning with a laser light emitted by the oscillation by driving an optical scanning apparatus for scanning so that a laser beam irradiating a prescribed position can be obtained; and “irradiation with a laser beam” means focusing the laser light obtained by the scanning and irradiating a rewritable thermal label of the non-contact type with the focused laser light.

The optical scanning apparatus is not particularly limited. For example, an apparatus comprising a source of a laser light, scanning mirrors which can be driven for rotation and are used for scanning with the laser light emitted from the source and an optical system for correction of a focal distance to focus the laser light scanned by the scanning mirrors can be used.

Since, in general, a near infrared laser beam having a wavelength in the range of 700 to 1,500 nm is used in the present invention as described later, any apparatus can be used as the source of the laser light in the optical scanning apparatus as long as the apparatus can activate the oscillation for a laser light having a wavelength in the above range, and the apparatus is not particularly limited. Semiconductor lasers (830 nm) and YAG lasers (1,064 nm) are preferable.

As the scanning mirror which can be driven for rotation and is used for scanning with the laser light emitted from the source by the oscillation for the laser light, a galvanomirror, a polygon mirror or a resonant mirror can be used. The galvanomirror is a mirror having a magnet and controlled by an outside magnetic field. The polygon mirror is a mirror of a polygon which is rotated. The resonant mirror is a mirror used under the same principle as that for the galvanomirror except that the mirror is driven at a resonance frequency.

In the optical scanning apparatus, for example, a f-θ lens can be used as the optical system for correction of the focal distance which is used for focusing the laser light scanned by the scanning mirror.

FIG. 1 shows a schematic diagram exhibiting an example of the optical scanning apparatus using a galvanomirror as the scanning mirror.

A laser light emitted from an oscillator of a laser 11 passes through a lens 12 so that the spot diameter of the laser light is increased, is reflected at a galvanomirror 14*a* for scanning along the Y-axis and a galvanomirror 14*b* for scanning along the X-axis driven for rotation by a motor 13*a* and a motor 13*b*, respectively, is focused into a laser beam 16 having a prescribed diameter by an optical system for correction of the focal distance 15 using a f-θ lens or the like and irradiates a rewritable thermal label of the non-contact type 17.

In the recording method of the present invention, when a prescribed drawing is conducted by irradiation with a leaser beam focused on the rewritable thermal label of the non-contact type using, for example, the above optical scanning apparatus, the drawing by the scanning with the laser light can be conducted only when the galvanomirrors move at a substantially uniform speed.

Specifically, when an image of a character is made by the drawing, the galvanomirrors are driven at a position before the starting point of drawing the character by a short distance while the oscillator of the laser is switched off and is adjusted so that the galvanomirrors move at a substantially uniform speed when the virtual laser beam reaches the starting point of the drawing. In the present invention, the term "virtual laser beam" is defined as the locus of a laser beam which would be emitted if the oscillator of the laser would be switched on. When the virtual laser beam reaches the starting point of drawing the character, the oscillator of the laser is switched on, and the drawing is started. The galvanomirrors move at a substantially uniform speed during the drawing.

The oscillator of the laser is switched off at the end point of the character, and the drawing is suspended. The speed of the galvanomirrors is kept the same or changed while the galvanomirrors are continuously driven, and the movement of the galvanomirrors is adjusted so that the virtual laser beam reaches the starting point of the subsequent character.

By adopting the above method, irradiating with an excessive laser energy in the vicinity of the starting point and the end point of a character in the conventional method can be prevented as described in the following.

In the conventional recording method, since the scanning mirror along the X-axis and the scanning mirror along the Y-axis are stopped at the beginning (the starting point) and at the end (the end point) of drawing a line, the driving of scanning mirrors along each of the axes are accelerated or decelerated at portions in the vicinity of the starting point and the end point. Since the laser beam is applied at a constant output during the period of the acceleration and the deceleration, the laser energy is applied in a greater amount at portions in the vicinity of the starting point and the end point than the amount in other portions, and degradation of the substrate takes place more markedly in the excessively irradiated portions.

The above drawback can be prevented by using the recording method of the present invention.

In the recording method of the present invention, it is preferable that, when a line to be drawn overlaps with a line drawn before, the scanning with the laser light is conducted in a manner such that suspending drawing just before overlapping the line drawn before and resuming drawing after the virtual laser beam passes said line drawn before. Specifically, when a character is drawn by connecting lines, the drawing is conducted by driving the scanning mirrors in a manner such that the virtual laser beam passes the overlapped portion while the oscillator of the laser is switched off so that the line drawn before is not irradiated again with the laser beam, and the oscillator of the laser is switched on after the virtual laser beam has passed the overlapped portion. Due to the above operation, the overlapped portion is not irradiated with the laser beam again, and degradation of the substrate can be suppressed.

When a character is drawn by connecting lines, the conventional method has a problem in that degradation of the substrate takes place in the overlapped portion due to the repeated irradiation with the laser beam since a line drawn before is irradiated again with the laser beam. This problem can be overcome by using the above recording method.

In the recording method of the present invention, when a line comprising a folded point is drawn, drawing a prescribed portion of the folded line by scanning with the laser light, suspending the scanning with the laser light when the laser beam reaches said folded point, driving of the optical scanning apparatus being kept continuously in a manner such that the virtual laser beam makes a loop starting from said folded point, and when the virtual laser beam returns to said folded point and passes said folded point, resuming the scanning with the laser light for drawing the next portion of the folded line. Irradiation of the point of a line folded at a sharp angle with an excessively great amount of laser energy can be prevented by the above method.

When a character is drawn, it is preferable that, when the scanning of a line with the laser beam is completed, the drawing of the next line is started not immediately but after a short spun of time by driving the scanning mirrors for the short spun of time while the oscillator of the laser is switched off. Erasure or a decrease in the concentration of the adjacent image can be prevented by this operation.

In the conventional recording method, a problem arises when an cluster of lines such as a bar code is drawn in that the line of the bar code drawn before is erased or has a decreased concentration due to the drawing of the adjacent subsequent line depending on the relation between the time interval between the drawings of adjacent lines and the temperature of the substrate caused by the irradiation with the laser beam. This problem can be overcome by using the above recording method.

To further describe the recording method of the present invention, the difference in the process between the recording method of the present invention and the conventional recording method will be described in the following, taking a recording of a character "A" as an example with reference to FIGS. 2*a*and 2*b*.

Figure 2A:
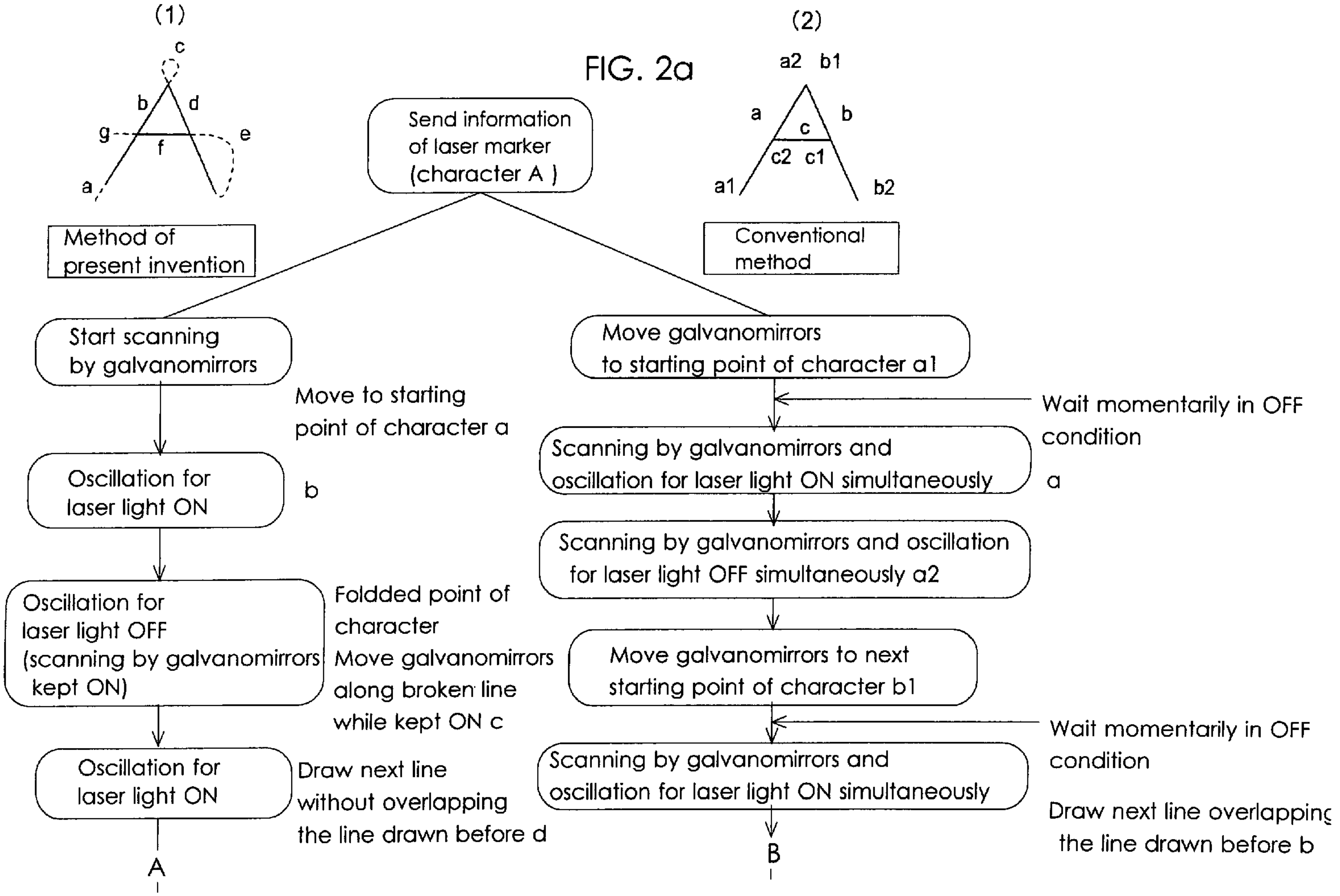
FIGS. 2*a* and 2*b* show a diagram exhibiting the difference in the process between the recording method of the present invention and the conventional recording method.
Figure 2B:
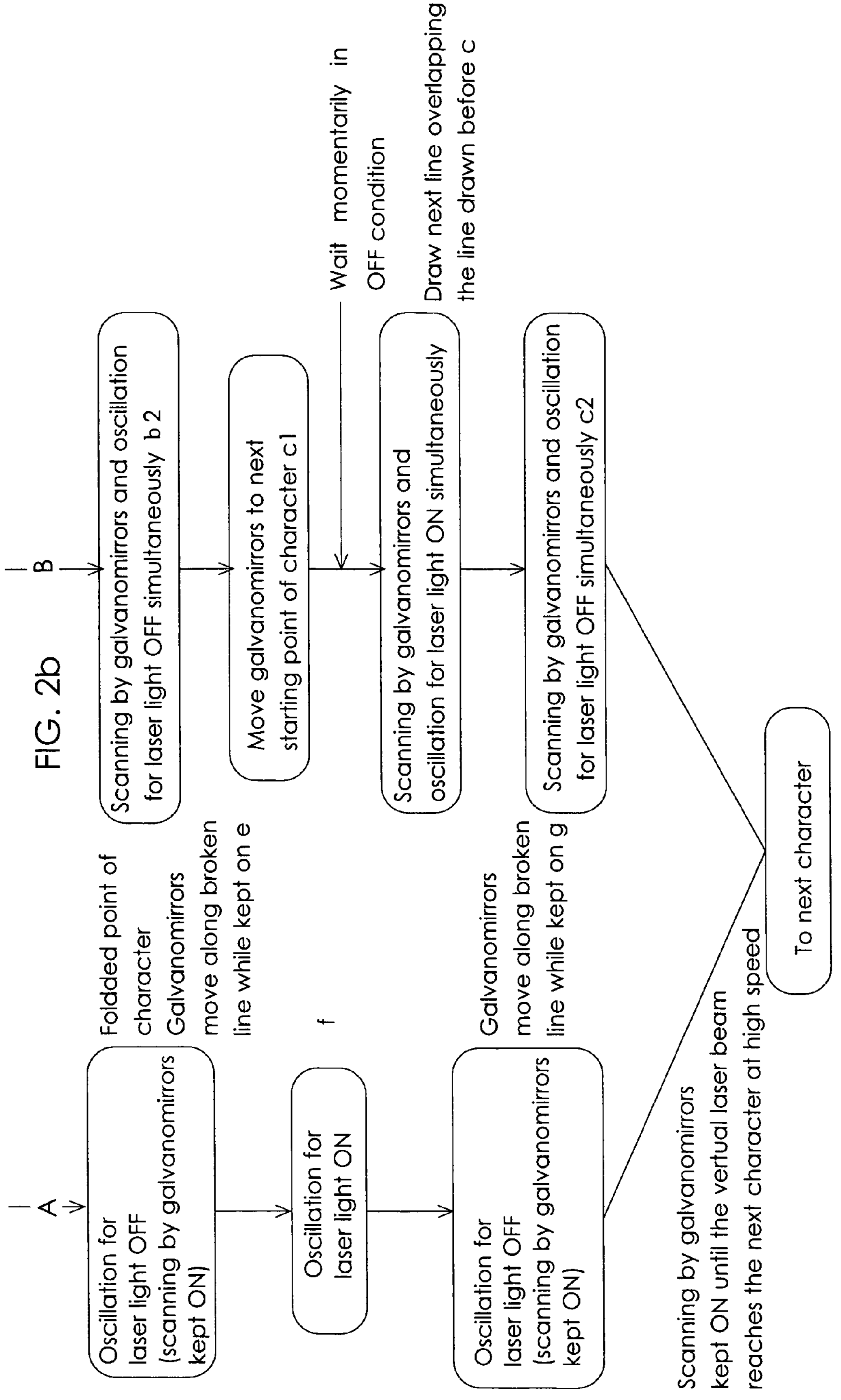

FIGS. 2*a* and 2*b* show a diagram exhibiting the difference in the process between the recording method of the present invention and the conventional recording method when a character "A" is recorded. The process in accordance with the recording method of the present invention is shown at the left side, and the process in accordance with the conventional recording method is shown at the right side.

The process in accordance with the recording method of the present invention and the process in accordance with the conventional recording method will be described with reference to FIGS. 2*a* and 2*b*.

The process in accordance with the recording method of the present invention (1) in FIGS. 2*a* and 2*b* will be described first.

In the process in accordance with the recording method of the present invention, (a) the scanning by the galvanomirrors is started, and the galvanomirrors are driven until the virtual laser beam reaches the starting point of the character; (b) the oscillation for a laser light is activated (ON) at the starting point of the character, and a line is drawn by irradiation with the laser beam; (c) the oscillation for a laser light is inactivated (OFF) when the laser beam reaches the apex of the character "A" (a folded point in the character), and the galvanomirrors are driven so that the virtual laser beam moves along a loop shown by a broken line; and (d) when the virtual laser beam passes the end point of the line drawn above in (b), the oscillation for a laser light is activated (ON) for irradiation with the laser beam, and the subsequent line is drawn without overlapping the line drawn before.

(e) When the laser beam reaches the end point of the line drawn above in (d) (the lower end portion at the right side of the character "A"; a folded portion of the character), the oscillation for a laser light is inactivated (OFF), and the scanning by the galvanomirrors is made in a manner such that the virtual laser beam moves along the line shown by the broken line; (f) when the virtual laser beam passes the line drawn above in (d), the oscillation for a laser light is activated (ON) for irradiation with the laser beam to draw the line, and the oscillation for a laser light is inactivated (OFF) immediately before the laser beam reaches the line drawn above in (b) (the line at the left side of the character "A"); and (g) the scanning by the galvanomirrors is made in a manner such that the virtual laser beam moves along the line shown by the broken line. The character "A" can be drawn as described above.

The scanning is continued at a high speed until the virtual laser beam reaches the subsequent character while the galvanomirrors are switched on.

The process in accordance with the conventional recording method ((2) in FIGS. 2*a* and 2*b*) will be described in the following.

In the process in accordance with the conventional method, (a1) the scanning by the galvanomirrors is started and, then, stopped when the virtual laser beam reaches the starting point of the character, and the galvanomirrors are momentarily kept waiting; (a) the scanning by the galvanomirrors is started, and the oscillation for a laser light is activated (ON) for the irradiation with the laser beam to draw the line simultaneously; (a2) when the laser beam reaches the apex of the character "A", the scanning by the galvanomirrors is stopped and the oscillation for a laser light is inactivated (OFF), simultaneously; and (b1) the scanning by the galvanomirrors is started and, then, stopped when the virtual laser beam reaches the starting point of the subsequent character, and the galvanomirrors are momentarily kept waiting.

(b) The scanning by the galvanomirrors is started, the oscillation for a laser light is activated (ON) for irradiation with the laser beam simultaneously, and the subsequent line is drawn, overlapping the line drawn above; (b2) when the laser beam reaches the end point of the line drawn above in (b) (the lower end portion at the right side of the character "A"), the scanning by the galvanomirrors is stopped and the oscillation for a laser light is inactivated (OFF), simultaneously; (c1) the scanning by the galvanomirrors is started and, then, stopped when the virtual laser beam reaches the starting point of the subsequent character, and the galvanomirrors are momentarily kept waiting; (c) the scanning by the galvanomirrors is started, the oscillation for a laser light is activated (ON) for irradiation with the laser beam simultaneously, and the subsequent line is drawn, overlapping the line drawn above; and (c2) when the laser beam reaches the end point of the line drawn above in (c), the scanning by the galvanomirrors is stopped and the oscillation for a laser light is inactivated (OFF), simultaneously. The character "A" can be drawn as described above.

It is preferable that the laser beam used in the present invention is a near infrared laser beam having a wavelength in the range of 700 to 1,500 nm. A laser beam having a wavelength shorter than 700 nm is not preferable since visibility and readability of marks read by optical reflection decrease. A laser beam having a wavelength longer than 1,500 nm is not preferable since energy per pulse is great, and the layer for absorbing light and converting into heat is gradually destroyed due to a great influence of heat to decrease durability in the repeated recording and erasure.

In the recording method in accordance with the present invention, the scanning mirrors are continuously driven, and the scanning with the f laser light or the drawing is made only when the scanning mirrors move at a substantially uniform speed.

In the method of the present invention, it is necessary that the distance between the surface of the rewritable thermal label and the source of the laser light during the recording is selected with consideration on the prevention of degradation of the substrate, the concentration of characters (the readability of a bar code) and the size of the characters although the distance may be different depending on the scanning speed and the output for the irradiation. An output of the laser of 3.0 to 3.6 W, a distance of the irradiation of 200 to 210 mm and a duty of 65 to 75% are preferable for the recording. An output of the laser of 8 W, a distance of the irradiation of 420 to 425 mm and a duty of 100% are preferable for the erasure. A faster scanning speed is preferable as long as the property of printing and the property of erasure are not adversely affected.

An excellent image can be obtained by rapidly cooling the image by blowing with the cool air or the like after the irradiation with the laser beam for recording has been made. As for the cooling operation, the scanning with the laser light and the rapid cooling may be conducted alternately or simultaneously.

The erasure of a recorded image in the method of the present invention is conducted so that the information on the rewritable thermal label can be replaced with a new information. For the erasure, the surface of the label having a recorded information is irradiated with a near infrared laser beam of 700 to 1,500 nm. The amount of the remaining image can be further decreased by further decreasing the cooling rate in accordance with a method of bringing the image into contact with a heated roll or a method of blowing the heated air to the image in combination with the irradiation with the laser beam having a prescribed amount of energy.

A heated roll can heat the surface of the label at about 100 to 140° C. within 4 seconds after starting the irradiation with the laser beam for the erasure. Any conventional heating rolls can be used without restrictions as long as the surface of the label is not damaged. For example, a rubber roll or a stainless steel roll can be used. In particular, a silicone rubber roll exhibiting excellent heat resistance is preferable. The hardness of the rubber is preferably 40 degrees or greater. When a soft rubber roll having a hardness smaller than 40 degrees is used, adhesion to the layer for absorbing light and converting into heat increases, and there is the possibility that the layer for absorbing light and converting into heat is attached to and cleaved by the rubber roll.

A recorded image can be erased by blowing the heated air to the image. In this case, the air heated at about 80 to 140° C. is supplied for 10 to 60 seconds.

When an image is recorded after an image recorded before is erased in the rewriting in accordance with the method of the present invention, the recording of the image is conducted in accordance with the same procedures as those conducted for recording the former image. In particular, the rewriting can be achieved by irradiation with the laser beam in the non-contact condition even when the rewritable thermal label remains attached to an adherend.

The rewritable thermal label of the non-contact type to which the recording method of the present invention can be applied is not particularly limited, and a label suitably selected from conventional rewritable thermal labels of the non-contact type can be used. For example, rewritable thermal labels of the non-contact type described in Japanese Patent Application Laid-Open No. 2003-118238 can be used. In general, labels having a reversible heat sensitive color developing layer the color of which is developed or erased by heat generated by the optical stimulus in the layer for absorbing light and converting into heat and enabling rewriting by the repeated recording (writing and formation of images) and erasure in the non-contact condition, are preferable.

EXAMPLES

The present invention will be described more specifically with reference to examples in the following. However, the present invention is not limited to the examples.

Preparation Example 1

Preparation of a Coating Fluid for Forming a Heat Sensitive Color Development Layer (Fluid A)

A triarylmethane compound 3-(4-diethylamino-2-ethoxyphenyl)-3-(1-ethyl-2-methylindol-3-yl)-4-azaphthalide as the dye precursor in an amount of 100 parts by weight, 30 parts by weight of 4-(N-methyl-N-octadecylsulfonylamino) phenyl as the reversible color developer, 1.5 parts by weight of polyvinyl acetal as the dispersant and 2,500 parts by weight of tetrahydrofuran as the diluent were pulverized and formed into a dispersion using a pulverizer and a disperser, and a coating fluid for forming a heat sensitive color development layer (Fluid A) was prepared.

Preparation Example 2

Preparation of a Coating Fluid for Forming a Layer for Absorbing Near Infrared Light and Converting into Heat (Fluid B)

An agent for absorbing near infrared light and converting into heat (a nickel complex-based coloring agent) [manufactured by TOSCO Co., Ltd.; the trade name: "SDA-5131"] in an amount of 1 part by weight, 100 parts by weight of a binder of the ultraviolet curable type (a urethane acrylate) [manufactured by DAINICHI SEIKA COLOR & CHEMICALS MFG. Co., Ltd.; the trade name: "PU-5(NS)] and 3 parts by weight of an inorganic pigment (silica) [manufactured by NIPPON AEROSIL Co., Ltd.: the trade name: "AEROSIL R-972"] were formed into a dispersion using a disperser, and a coating fluid for forming a layer for absorbing near infrared light and converting into heat (Fluid B) was prepared.

Preparation Example 3

Preparation of an Adhesive Layer Attached with a Release Sheet

On one side of a polyethylene terephthalate film having a thickness of 100 μm [manufactured by TORAY Co., Ltd.; the trade name: "LUMIRROR T-60"], a silicone resin containing a catalyst [manufactured by TORAY DOW CORNING Co., Ltd.; the trade name: "SRX-211"] was applied to form a coating layer having a thickness of 0.7 μm after being dried, and a release sheet was prepared.

On the side of the silicone resin layer of the above release sheet, an adhesive coating fluid prepared by adding 3 parts by weight of a crosslinking agent [manufactured by NIPPON POLYURETHANE INDUSTRY Co., Ltd.; the trade name: "CORONATE L"] to 100 parts by weight of an acrylic adhesive [manufactured by TOYO INK MFG. Co., Ltd.; the trade name: "ORIBAIN BPS-1109"] was applied in accordance with the roll knife coating process to form a coating layer having a thickness of 30 μm after being dried. The obtained coated film was dried in an oven at 100° C. for 2 minutes, and an adhesive layer attached with a release sheet was prepared.

Example 1

(1) Preparation of a Sample for Recording

On one side of an expanded polyethylene terephthalate film having a thickness of 100 μm [manufactured by TOYOBO Co., Ltd,; the trade name: "CRISPER K2424"] as the substrate, Fluid A prepared in Preparation Example 1 was applied in accordance with the gravure coating process to form a film having a thickness of 4 μm after being dried. The obtained coated film was dried in an oven at 60° C. for 5 minutes, and a heat sensitive color development layer was formed. On the formed heat sensitive color development layer, Fluid B prepared in Preparation Example 2 was applied in accordance with the flexo printing process to form a coating layer having a thickness of 1.2 μm after being dried and dried for 1 minute in an oven at 60° C. The formed accumulating sheet was irradiated with ultraviolet light in an amount of light of 220 mJ/$cm^2$ to prepare a layer for absorbing light and converting into heat. The obtained accumulating sheet was used as the substrate for a rewritable thermal label.

The adhesive layer attached with a release sheet prepared in Preparation Example 3 was laminated to the above substrate for a rewritable thermal label on the face which did not have the heat sensitive color development layer and the layer for absorbing light and converting into heat, and a sample for recording was prepared.

(2) Recording and Erasure (a) On the sample for recording obtained above in (1), a FIG. "4" was recorded in accordance with the method of scanning with the laser light shown in FIG. 3 (the method of the present invention) as shown in the following.

<Method of Printing (Recording)>

The recording was conducted using a YAG laser (the wavelength: 1064 nm) [manufactured by SUNX Ltd.; the trade name: "LP-F10W"] as the laser marker for irradiation with the laser beam.

The conditions were adjusted as follows: the distance of irradiation: 210 mm; the output of the laser: 3.3 W; the duty: 70%; the scanning speed: 3,000 mm/s; the pulse cycle: 100 μs; the line width: 0.1 mm; and the distance for block formation: 0.05 mm.

Figure 3:
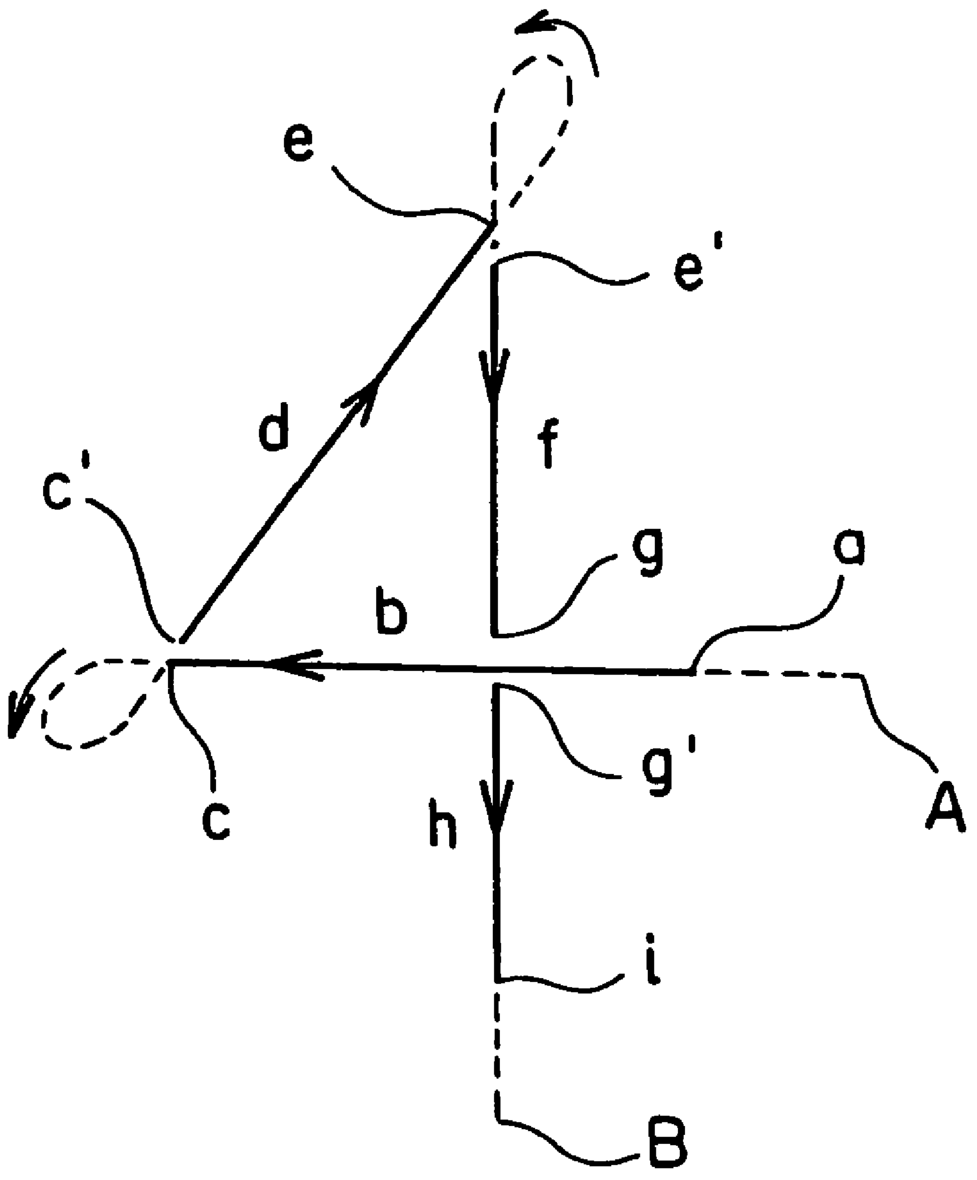
FIG. 3 shows a diagram exhibiting the process of scanning with a laser light in the drawing of a character in an Example.

In FIG. 3, the driving of the scanning mirrors was started at the point A. When the virtual laser beam reached the starting point of the figure a, the oscillator of the laser was switched on to start the drawing, and a line b was drawn. At a folded point c of the figure, the oscillator of the laser was switched off, and the scanning mirrors were driven in a manner such that the virtual laser beam formed a loop shown by the broken line. When the virtual laser beam reached a point c', the oscillator of the laser was switched on to resume the drawing, and a line d was drawn.

At a folded point of the figure e, the oscillator of the laser was switched off, and the scanning mirrors were driven in a manner such that the virtual laser beam formed a loop shown by the broken line. When the virtual beam reached a point e', the oscillator of the laser was switched on to resume the drawing, and a line f was drawn. At a point g, the oscillator of the laser was switched off. When the virtual beam reached a point g', the oscillator of the laser was switched on to resume the drawing, and a line h was drawn. At a point i which was the final point of the figure, the oscillator of the laser was switched off, and the drawing was completed.

The driving of the scanning mirrors was stopped when the virtual laser beam moved along the locus shown by the broken line and reached a point B. The FIG. "4" was recorded as described above.

The scanning mirrors moved at a substantially uniform speed while the oscillator of the laser was switched on.

The figure recorded as described above was erased in accordance with the following method.

<Method of Erasure>

After the air heated at 130° C. was supplied to the recorded sample for 20 seconds, the recorded sample was left standing under an ordinary environment for cooling, and the recorded image was erased.

(b) To the sample for recording obtained above in (1), a bar code was recorded in accordance with the method of scanning with the laser light of the present invention.

A wide line in a bar code was a cluster of lines, and the method for recording the individual lines will be described with reference to FIG. 4.

<Method of Recording (Printing)>

The recording was conducted using a YAG laser (the wavelength: 1064 nm) [manufactured by SUNX Ltd.; the trade name: "LP-F10W"] as the laser marker for irradiation with the laser beam.

The conditions were adjusted as follows: the distance of irradiation: 210 mm; the output of the laser: 3.3 W; the duty: 70%; the scanning speed: 3,000 mm/s; the pulse cycle: 100 μs; the line width: 0.1 mm; and the distance for block formation: 0.05 mm.

Figure 4:
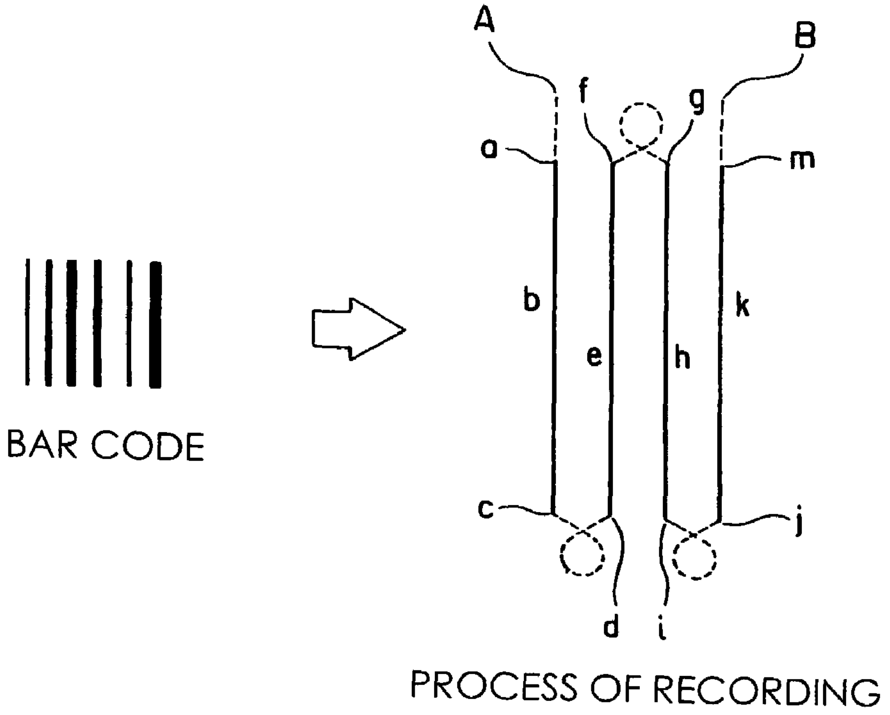
FIG. 4 shows a diagram exhibiting the process of scanning with a laser light in the drawing of a bar code in an Example.

In FIG. 4, the driving of the scanning mirrors was started at a point A. When the virtual laser beam reached the starting point a, the oscillator of the laser was switched on to start the drawing, and a line b was drawn. At a point c, the oscillator of the laser was switched off, and the scanning mirrors were driven in a manner such that the virtual laser beam formed a loop shown by the broken line. When the virtual laser beam reached a point d, the oscillator of the laser was switched on to resume the drawing, and a line e was drawn.

At a point f, the oscillator of the laser was switched off, and the scanning mirrors were driven in a manner such that the virtual laser beam formed a loop shown by the broken line. When the virtual laser beam reached a point g, the oscillator of the laser was switched on to resume the drawing, and a line h was drawn. At a point i, the oscillator of the laser was switched off, and the scanning mirrors were driven in a manner such that the virtual laser beam formed a loop shown by the broken line. When the virtual laser beam reached a point j, the oscillator of the laser was switched on to resume the drawing, and a line k was drawn. At a point m which was the final point of the bar code, the oscillator of the laser was switched off, and the drawing was completed.

The driving of the scanning mirrors was stopped when the virtual laser beam moved along the locus shown by the broken line and reached the point B. The bar code is recorded as described above.

The scanning mirrors moved at a substantially uniform speed while the oscillator of the laser was switched on.

When the above method of recording was used, erasure or a decrease in the concentration of the line of the bar code formed before did not take place while the adjacent line was drawn.

<Method of Erasure>

The recorded image was erased by the same method as described in (a).

(3) Evaluation

The recording and the erasure described above in (2) (a) were repeated 50 times, 500 times and 1,000 times, and the condition of the surface of the substrate at the starting point a, the end point i and the overlapping portions c-c', e-e' and g-g' in the figure were observed. The readability of the bar code was evaluated after the recordings and the erasures described above in (2) (b) were repeated 500 times and 1,000 times. The results are shown in Table 1.

Example 2

(1) Preparation of a Sample for Recording

On one side of an expanded polyethylene terephthalate film having a thickness of 100 μm [manufactured by TOYOBO Co., Ltd,; the trade name: "CRISPER K2424"] as the substrate, a mixture of 2631.5 parts by weight of Fluid A prepared in Preparation Example 1 and 104 parts by weight of Fluid B prepared in Preparation Example 2 was applied in accordance with the flexo printing process to form a coating layer having a thickness of 5.0 μm after being dried. The formed laminate was irradiated with ultraviolet light to prepare a heat sensitive color development layer which was a layer of a mixture of a heat sensitive color development agent and an agent for absorbing light and converting into heat, and a substrate for a rewritable thermal label was prepared.

Using the substrate prepared above, a sample for recording was prepared in accordance with the same procedures as those conducted in Example 1 (1).

(2) Recording and Erasure

On the sample for recording prepared above in (1), a FIG. "4" or a barcode was recorded and then erased in accordance with the same procedures as those conducted in Example 1 (2).

(3) Evaluation

The recording and the erasure of FIG. "4" described above in (2) were repeated 50 times, 500 times and 1,000 times, and the recording and the erasure of a barcode described above in (2) were repeated 500 times and 1,000 times and the evaluation was conducted in accordance with the same procedures as those conducted in Example 1 (3). The results are shown in Table 1.

Comparative Example 1

(1) Preparation of a Sample for Recording

A sample for recording was prepared in accordance with the same procedures as those conducted in Example 1 (1).

(2) Recording and Erasure (a) On the sample for recording obtained above in (1), a FIG. "4" was recorded in accordance with the method of scanning with the laser light shown in FIG. 5 as shown in the following.

<Method of Printing (Recording)>

The recording was conducted using a YAG laser (the wavelength: 1064 nm) [manufactured by SUNX Ltd.; the trade name: "LP-F10"] as the laser marker used for irradiation with the laser beam.

The conditions of irradiation were adjusted as follows: the distance of irradiation: 180 mm; the output of the laser: 2.0 W; the scanning speed: 1,000 mm/s; the pulse cycle: 100 μs; the line width: 0.1 mm; and the distance for block formation: 0.05 mm.

Figure 5:
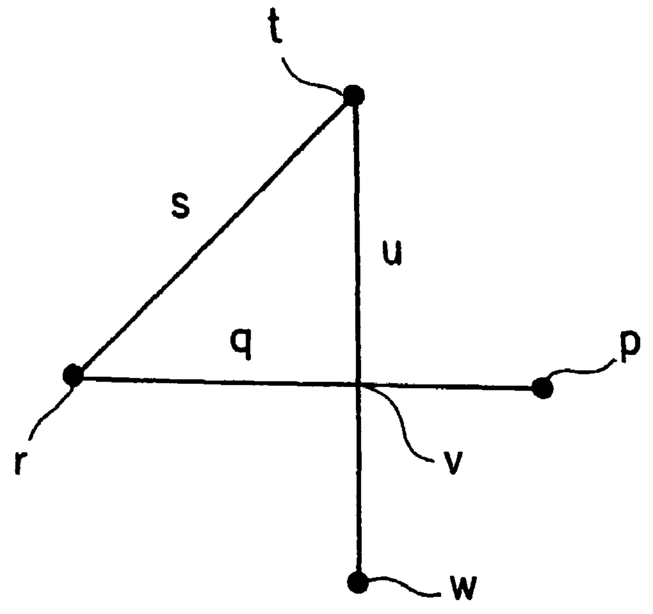
FIG. 5 shows a diagram exhibiting the process of scanning with a laser light in the drawing of a character in a Comparative Example.

In FIG. 5, the driving of the scanning mirrors was started. When the virtual laser beam reached the starting point of the figure p, the driving of the scanning mirrors was stopped, and the scanning mirrors were momentarily kept waiting. Then, the scanning mirrors were driven simultaneously, and the oscillator of the laser was switched on to start the drawing. Thus, a line q was drawn. When the laser beam reached a point r, the driving of the scanning mirrors was stopped and the oscillator of the laser was switched off, simultaneously.

After the scanning mirrors were kept waiting momentarily at the point r, the scanning mirrors were driven simultaneously, and the oscillator of the laser was switched on to resume the drawing. Thus, a line s was drawn. When the laser beam reached a point t, the driving of the scanning mirrors was stopped and the oscillator of the laser was switched off, simultaneously.

After the scanning mirrors were kept waiting momentarily at the point t, the scanning mirrors were driven simultaneously, and the oscillator of the laser was switched on to resume the drawing. Thus, the drawing of a line u was started. When the laser beam drawing the line u reaches the end point of the figure w after intersecting the line q drawn before at the point of v, the driving of the scanning mirrors was stopped and the oscillator of the laser was switched off, simultaneously. The FIG. "4" was recorded as described above.

The figure recorded as described above was erased in accordance with the following method.

<Method of Erasure>

After the air heated at 130° C. was supplied to the recorded sample for 20 seconds, the recorded sample was left standing under an ordinary environment for cooling, and the recorded image was erased.

(b) On the sample for recording obtained above in (1), a barcode was recorded in accordance with the method of recording (printing) method as shown in the following. A wide line in a bar code was a cluster of lines and the method for recording the individual lines will be described in reference to FIG. 6.

<Method of Recording (Printing)>

The recording was conducted using a YAG laser (the wavelength: 1064 nm) [manufactured by SUNX Ltd.; the trade name: "LP-F10"] as the laser marker for irradiation with the laser beam.

The conditions of irradiation were adjusted as follows: the distance of irradiation: 180 mm; the output of the laser: 2.0 W; the scanning speed: 1,000 mm/s; the pulse cycle: 100 μs; the line width: 0.1 mm; and the distance for block formation: 0.05 mm.

Figure 6:
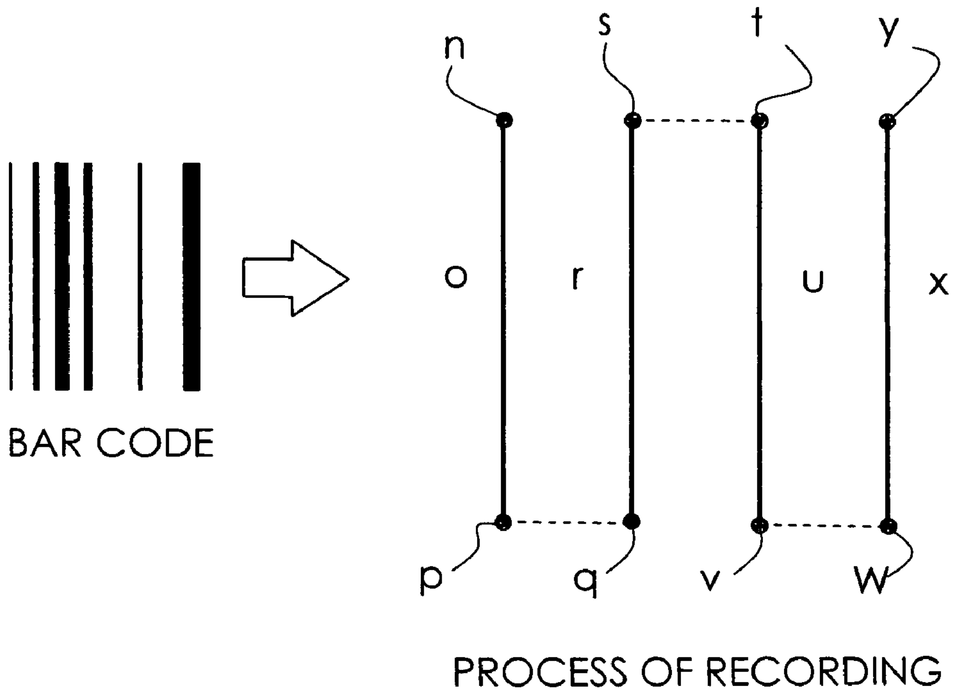
FIG. 6 shows a diagram exhibiting the process of scanning with a laser light in the drawing of a bar code in a Comparative Example.

In FIG. 6, the driving of the scanning mirrors was started. When the virtual laser beam reached the starting point n of the line, the driving of the scanning mirrors was stopped, and the scanning mirrors were momentarily kept waiting. Then, the scanning mirrors were driven, and simultaneously the oscillator of the laser was switched on to start the drawing. Thus, a line o was drawn. When the laser beam reached a point p, the driving of the scanning mirrors was stopped and the oscillator of the laser was switched off simultaneously.

Then, the driving of the scanning mirrors was started in a manner such that the virtual laser beam moved along a broken line. When the virtual laser beam reached the point q, the driving of the scanning mirrors was stopped and the scanning mirrors were momentarily kept waiting. Then, the scanning mirrors were driven and the oscillator of the laser was switched on simultaneously to resume the drawing. Thus, a line r was drawn. When the laser beam reached a point s, the driving of the scanning mirrors was stopped and the oscillator of the laser was switched off simultaneously.

Then, the driving of the scanning mirrors was started in a manner such that the virtual laser beam moved along a broken line. When the virtual laser beam reached the point t, the driving of the scanning mirrors was stopped and the scanning mirrors were momentarily kept waiting. Then, the scanning mirrors were driven and the oscillator of the laser was switched on simultaneously to resume the drawing. Thus, a line u was drawn. When the laser beam reached a point v, the driving of the scanning mirrors was stopped and the oscillator of the laser was switched off simultaneously.

Then, the driving of the scanning mirrors was started in a manner such that the virtual laser beam moved along a broken line. When the virtual laser beam reached the point w, the driving of the scanning mirrors was stopped and the scanning mirrors were momentarily kept waiting. Then, the scanning mirrors were driven and the oscillator of the laser was switched on simultaneously to resume the drawing. Thus, a line x was drawn. When the laser beam reached a point y, the driving of the scanning mirrors was stopped and the oscillator of the laser was switched off, simultaneously.

Thus a barcode was recorded.

<Method of Erasure>

The recorded image was erased by the same method as described in (a).

(3) Evaluation

The recording and the erasure described above in (2)(a) were repeated 50 times, 500 times and 1,000 times, and the condition of the surface of the substrate at the starting point p, the end point w and the overlapping portions r, t and v in the figure were observed. The readability of the bar code was evaluated after the recordings and the erasures described above in (2)(b) were repeated 500 times. The results are shown in Table 1.

Comparative Example 2

(1) Preparation of a Sample for Recording

A sample for recording was prepared in accordance with the same procedures as those conducted in Example 2 (3).

(2) Recording and Erasure

On the sample for recording obtained above in (1), a FIG. "4" or a barcode was recorded and then erased in accordance with the same procedures as those conducted in Comparative Example 1 (2).

(3) Evaluation

The recording and the erasure of FIG. "4" described above in (2) were repeated 50 times, 500 times and 1,000 times, and the recording and the erasure of a barcode described above in (2) were repeated 500 times and the evaluation was conducted in accordance with the same procedures as those conducted in Comparative Example 1 (3). The results are shown in Table 1.

TABLE 1

| | Example | | Comparative Example | |
|---|---|---|---|---|
| | 1 | 2 | 1 | 2 |
| Condition of the surface of substrate after recording and erasure were repeated | | | | |
| 50 times | | | | |
| at the starting and end points | good | good | good | good |
| at the overlapping portion | good | good | good | good |
| 500 times | | | | |
| at the starting and end points | good | good | poor | poor |
| at the overlapping portion | good | good | poor | poor |
| 1,000 times | | | | |
| at the starting and end points | good | good | — | — |
| at the overlapping portion | good | good | — | — |
| Readability of bar code after recording and erasure were repeated | | | | |
| 500 times | good | good | poor | poor |
| 1,000 times | good | good | — | — |

Notes to Table 1
(1) Condition of the surface of the substrate
good: no destruction of the substrate found
poor: destruction of the substrate found
(2) Readability of a bar code
The readability of a bar code after the recording and the erasure were repeated 500 times or 1,000 times was evaluated in accordance with the following method.
The scanning was conducted by reciprocally irradiating a one-dimensional bar code symbol with a laser beam having a wavelength of 660 nm emitted from a portable bar code inspector [manufactured by IZUMI DATA LOGIC Co., Ltd.; "RJS INSPECTOR 3000"]. The scanning by the reciprocal irradiation was conducted ten times, and the average of the obtained values was used as the result of the evaluation. The printing quality of a bar code symbol is decided from the reflectances of the bar and the space, existence of voids or spots and the accuracy of the elements obtained by the scanning and classified into A, B, C and D in the order of the decreasing printing quality, A indicating the best printing quality, in accordance with the criterion of ANSI (American National Standards Institute). When the reading is not possible at all, the result is classified into F.
good: A to D in the ANSI evaluation
poor: F in the ANSI evaluation
In the above description, bar means the black line and space means white portion between lines, void means small white defect in the bar and spot means larger defect in the bar. The reflectances of the bar and the space are decided by the difference in reflectances between bar and blank portion, the presence of voids or spots is decided by the levels of the existence of these.

As shown by the results in Table 1, in accordance with the recording method of the present invention, the recording and the erasure could be repeated 500 times, and recording was possible without destruction of the surface of the substrate after the recording and the erasure were repeated 500 times in both cases where the heat sensitive color development layer and the layer for absorbing light and converting into heat were laminated (Example 1) and where the single heat sensitive color development layer containing the agent for absorbing light and converting into heat was formed (Example 2). The readability of a bar code was also excellent. The condition of the surface of the substrate after the recording and the erasure were repeated 1,000 times was almost the same as that after the recording and the erasure were repeated 500 times.

In contrast, in accordance with the conventional method, destruction was found on the surface of the substrate after the recording and the erasure were repeated 500 times or 1,000 times although the recording and the erasure could be repeated 50 times without destruction in both cases where the heat sensitive color development layer and the layer for absorbing light and converting into heat were laminated (Comparative Example 1) and where the single heat sensitive color development layer containing the agent for absorbing light and converting into heat was formed (Comparative Example 2). The readability of a bar code was not good also.

To summarize the advantages obtained by the invention, in accordance with the present invention, the method for recording information into a rewritable thermal label of the non-contact type which decreases damages to the recording face of a recording medium after repeated recording and erasure of information in accordance with the non-contact method and enables the recording medium to be used repeatedly 1,000 times or more can be provided.

When lines close to each other are recorded by continuous scanning with the laser light in recording an image formed by a cluster of lines such as a solid image, the scanning and the irradiation with the laser beam for forming the image of an adjacent line does not cause erasure or a decrease in the concentration at portions of the line recorded before, and a clear image of the lines can be obtained.

The rewritable thermal label of the non-contact type used in the present invention can be advantageously used as labels for control of articles such as labels attached to plastic containers used for transporting foods, labels used for control of electronic parts and labels attached to cardboard boxes for physical distribution management of articles.

What is claimed is:

1. A method for recording information into a rewritable thermal label of a non-contact type by irradiation with a laser beam, the method comprising, when a prescribed drawing is conducted by irradiation with a laser beam focused on the rewritable thermal label of a non-contact type using an optical scanning apparatus, driving the optical scanning apparatus continuously without activating oscillation for the laser light and conducting the drawing by activating the oscillation for the laser light and scanning with the laser light only when a virtual laser beam which is defined as a locus of a laser beam which is emitted if the oscillation for the laser light is active moves at a substantially uniform speed, wherein the optical scanning apparatus comprises a source of the laser light, scanning mirrors which are driven for rotation and are used for scanning with the laser light emitted from the source and an optical system for correction of a focal distance to focus the laser light scanned by the scanning mirrors and, when a prescribed drawing is conducted by irradiation with the laser beam focused on the rewritable thermal label of a non-contact type, the scanning mirrors are driven continuously and the drawing is conducted by activating the oscillation for the laser light and scanning with the laser light only when the scanning mirrors move at a substantially uniform speed.

2. The method for recording information into a rewritable thermal label of a non-contact type described in claim 1, wherein the scanning mirrors which are driven for rotation in the optical scanning apparatus comprise a galvanomirror, a polygon mirror or a resonant mirror.

3. The method for recording information into a rewritable thermal label of a non-contact type according to claim 1, wherein the optical system for correction of a focal distance in the optical scanning apparatus is a f-θ lens.

4. The method for recording information into a rewritable thermal label of a non-contact type according to claim 2, wherein the optical system for correction of a focal distance in the optical scanning apparatus is a f-θ lens.

5. The method for recording information into a rewritable thermal label of a non-contact type according to claim 1, wherein, when a line to be drawn overlaps with a line drawn before, the scanning with the laser light is conducted in a manner such that the drawing is suspended just before overlapping the line drawn before and resuming drawing after the virtual laser beam passes said line drawn before.

6. The method for recording information into a rewritable thermal label of a non-contact type according to claim 1, wherein, when a line comprising a folded point is drawn, drawing a prescribed portion of the folded line by scanning with the laser light, suspending the scanning with the laser light when the laser beam reaches said folded point, driving of the optical scanning apparatus being kept continuously in a manner such that the virtual laser beam makes a loop starting from said folded point, and when the virtual laser beam returns to said folded point and passes said folded point, resuming the scanning with the laser light for drawing the next portion of the folded line.

7. The method for recording information into a rewritable thermal label of a non-contact type described in claim 5, wherein the scanning mirrors which are driven for rotation in the optical scanning apparatus comprise a galvanomirror, a polygon mirror or a resonant mirror.

8. The method for recording information into a rewritable thermal label of a non-contact type described in claim 6, wherein the scanning mirrors which are driven for rotation in the optical scanning apparatus comprise a galvanomirror, a polygon mirror or a resonant mirror.

9. The method for recording information into a rewritable thermal label of a non-contact type according to claim 5, wherein the optical system for correction of a focal distance in the optical scanning apparatus is a f-θ lens.

10. The method for recording information into a rewritable thermal label of a non-contact type according to claim 6, wherein the optical system for correction of a focal distance in the optical scanning apparatus is a t-θ lens.

11. The method for recording information into a rewritable thermal label of a non-contact type according to claim 7, wherein the optical system for correction of a focal distance in the optical scanning apparatus is a f-θ lens.

12. The method for recording information into a rewritable thermal label of a non-contact type according to claim 8, wherein the optical system for correction of a focal distance in the optical scanning apparatus is a f-θ lens.

* * * * *